United States Patent [19]
Parker et al.

[11] 3,722,186
[45] Mar. 27, 1973

[54] AIR FILTER CONSTRUCTION
[75] Inventors: Jerry W. Parker, Santa Ana; John W. Scholz, Newport Beach; Kenneth E. Mitchell, Santa Ana, all of Calif.
[73] Assignee: Uni Filter, Orange, Calif.
[22] Filed: Jan. 27, 1972
[21] Appl. No.: 221,199

[52] U.S. Cl. .................. 55/304, 55/385, 55/422, 55/498, 55/505, 55/510, 55/522, 55/DIG. 28
[51] Int. Cl. ............................................. B01d 46/04
[58] Field of Search ............... 55/DIG. 28, 374–379, 55/293, 302, 492, 500, 505, 507, 385, 422, 328, 304, 510, 522; 210/448, 483, 497

[56] References Cited

UNITED STATES PATENTS

| 1,519,950 | 12/1924 | Boughan | 55/DIG. 28 |
| 1,538,041 | 5/1925 | Horton et al. | 55/DIG. 28 |
| 1,564,178 | 12/1925 | Orem | 55/DIG. 28 |
| 1,655,875 | 1/1928 | Orr | 55/379 X |
| 2,145,047 | 1/1939 | Goldkamp | 55/379 X |
| 2,316,353 | 4/1943 | Moorhead | 55/374 X |
| 2,722,285 | 11/1955 | Brace | 55/375 X |

Primary Examiner—Tim R. Miles
Assistant Examiner—Vincent Gifford
Attorney—Harvey B. Jacobson

[57] ABSTRACT

An air filter construction adapted to be easily mounted to various carburetor intake openings, said air filter construction comprising a generally cylindrical filter element of open pore foam material or the like, a coil compression spring mounted in the interior of the cylindrical filter element for supporting such in sealing engagement at one end thereof with the carburetor opening and including a plurality of substantially spaced convolution along its length to assure unhindered flow of air through the filter element into the carburetor opening.

4 Claims, 10 Drawing Figures

PATENTED MAR 27 1973 3,722,186

SHEET 1 OF 2

AIR FILTER CONSTRUCTION

The present invention is generally related to air filters and, more particularly, to an improved air filter construction for use with motorcycle carburetors and the like.

Many air filter devices have been provided in the past, such conventional constructions, however, for the most part, have required periodic replacement, such amounting to a substantial investment over a period of time. While more recently permanent air filter constructions have been proposed, such have been relatively expensive to manufacture and maintain and, accordingly, have been undesirable from a marketing standpoint.

It is an object of the present invention to provide a novel air filter construction which is rugged, durable, long-lasting, does not require periodic replacements and is relatively inexpensive to manufacture and maintain.

Another object of the present invention is to provide a unique air filter construction comprising a generally cylindrical filter element of open pore foam or the like and which is supported on a coil compression spring in a manner which permits limited flexing and vibration of the filter element to aid in cleaning the filter, thereby providing an air filter with self-cleaning characteristics.

It is a further object of the present invention to provide a versatile air filter construction, one form of which includes a closed and cylindrical filter element surrounding a coil compression spring such that it may be flexed or resiliently deformed, thereby permitting installation in relatively small areas such that one filter construction may be utilized for many carburetor installations and mounting configurations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
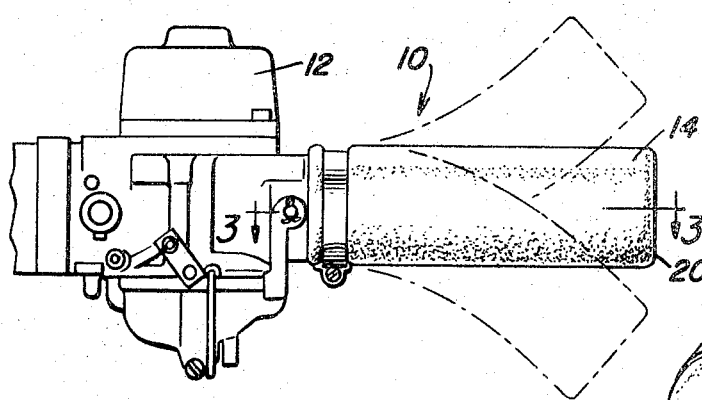
FIG. 1 is an elevational view of a first form of the air filter construction of the present invention illustrated as being mounted to a typical carburetor air intake opening.
Figure 2:
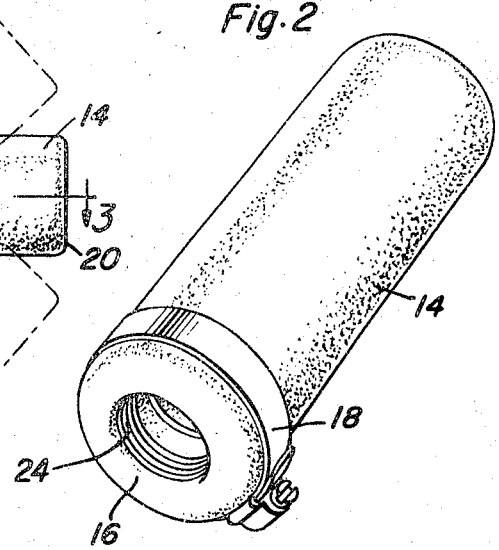
FIG. 2 is a perspective view of the air filter construction shown in FIG. 1.
Figure 3:
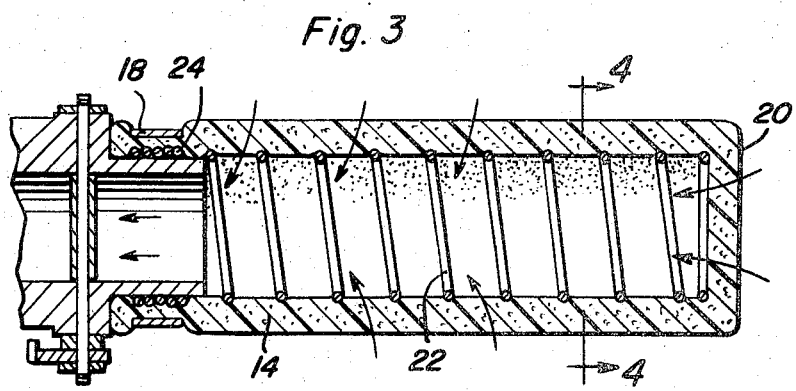
FIG. 3 is a sectional view taken substantially along section 3—3 of FIG. 1.
Figure 4:
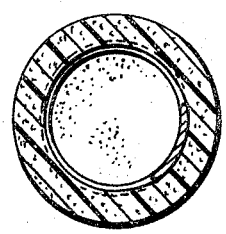
FIG. 4 is a sectional view taken along section 4—4 of FIG. 3.

Referring now more particularly, to FIGS. 1–4, a first form of the air filter construction of the present invention is generally indicated by the numeral 10 and it is illustrated in FIG. 1 as being mounted to the air intake opening of a typical carburetor mechanism 12. The filter construction includes a generally cylindrical filter element 14 which is adapted to permit the passage of air therethrough and to remove the contaminants from the air during such passage. Preferably, the filter element is made from open pore foam material, such as "Scott-Foam" which is a trade-mark product of Scott Paper Company. Of course, it is not intended that the invention be limited to this type of material and other materials exhibiting similar properties may be utilized, if desired.

The cylindrical filter element 14 is opened at one end 16 and is adapted to fit around the carburetor air intake mounting and is held in place by way of a circular clamp 18 of a conventional type. The opposite end 20 of the filter element is closed off by way of a circular section of the open pore material. A coil compression spring 22 is positioned in the interior of the filter element and extends along substantially the entire length thereof. The compression spring includes a plurality of convolutions which are substantially spaced longitudinally apart from each other along the interior of the filter element. As such, the flow of air passing through the filter element is substantially unhindered, thereby assuring sufficient air supply to the carburetor for proper fuel mixture.

It will be appreciated that the convolutions of the coil compression spring adjacent to the open end of the filter element are engaging, or nearly engaging, each other in order to define a substantially rigid mounting which surrounds the carburetor intake fitting, as indicated at 24. The circular clamp 18 is positioned in overlying relationship with the close convolutions at 24, such that tightening of the clamp is effective to compress the resilient foam material against these convolutions to assure an adequate seal around the carburetor fitting to prevent contaminated air from bypassing the filter element and entering the intake opening.

Figure 5:
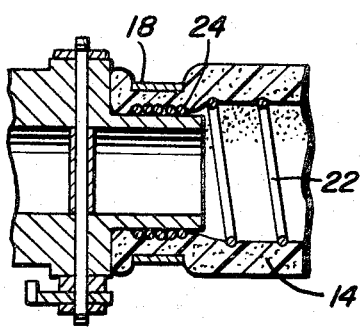
FIG. 5 is a partial sectional view of the filter construction illustrated in FIG. 3 but mounted to a carburetor having a smaller air intake opening.

Referring to FIG. 5, it will be appreciated that the air filter construction is adaptable to be installed on carburetor intake openings of smaller diameter than the inside diameter of the associated coil compression spring. The force of claim 18 are effective to press inwardly on the close convolutions 24 in such a manner as to effect distortion thereof in an inward direction to assume a configuration of lesser diameter corresponding to the outside diameter of the carburetor fitting. Thus, the close convolutions adjacent the open end of the filter element not only provide a solid mounting for the filter construction, but also are adaptable to accommodate carburetor fittings of lesser diameter. It will also be appreciated that the inherent flexibility of the coil compression spring permits the filter construction to be flexed or manually bent from side to side as shown in dash of FIG. 1 in order to mount the filter in relatively small spaces not uncommon for motorcycle carburetor installations. As such, the filter construction may be installed where conventional filters of comparable size could not be utilized. It should also be noted that due to the resiliency of the coil compression spring there is a constant flexing or vibration of the filter element from road and engine vibration which is effective to shake free many of the contaminants which have collected on the outer surfaces of the filter element. Thus, the air filter construction is provided with the advantage of engendering a self-cleaning characteristic not available with conventional filter constructions.

Figure 6:
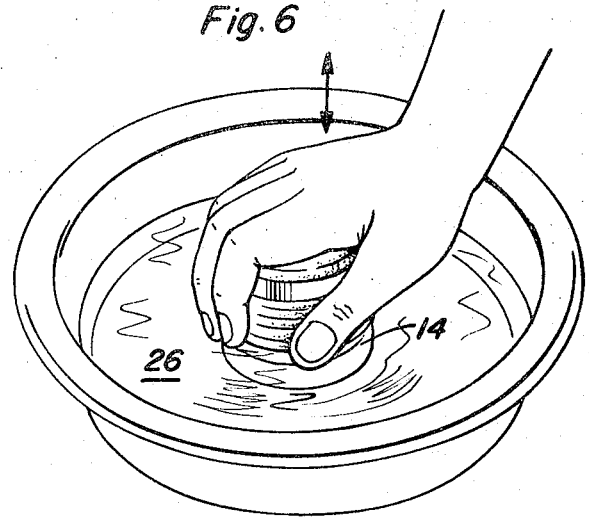
FIG. 6 illustrates the ease with which the filter construction of the present invention may be cleaned and lubricated.

It will be appreciated that the filter construction seldom has to be replaced. Periodic cleaning and lubrication is normally all that is required to maintain the filter element in proper operating condition. FIG. 6 illustrates the manner in which the filter construction may be cleaned and lubricated. The filter is removed from the carburetor and washed thoroughly with gasoline, kerosene or similar solvents. With the coil spring intact, the filter is compressed several times in the cleaning solvent 26 in a bowl or similar container to flush the trapped contaminants from the filter pores. Subsequently, the filter element should be saturated in oil, preferably SAE 50. The excess oil is removed and the unit reinstalled.

Figure 7:
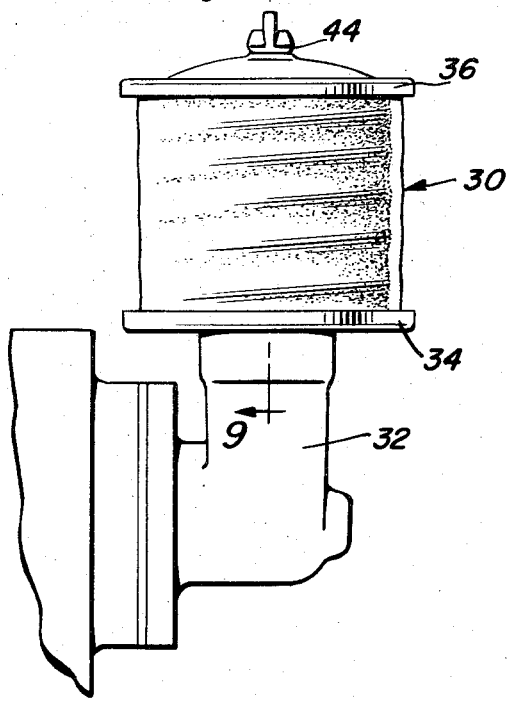
FIG. 7 is an elevational view of a second form of the air filter construction of the present invention mounted to a typical carburetor intake opening.
Figure 8:
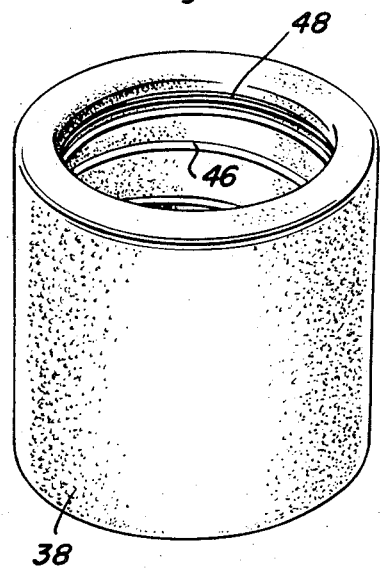
FIG. 8 is a perspective view of the second form of the air filter illustrated in FIG. 7.
Figure 9:
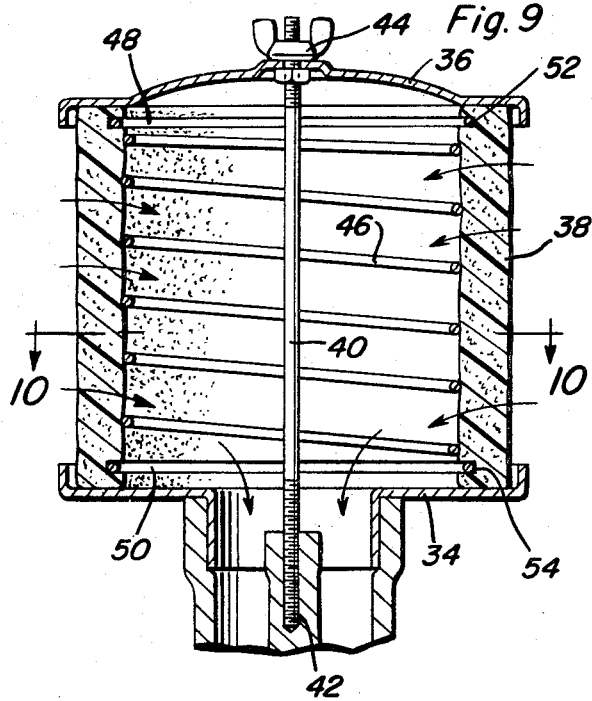
FIG. 9 is a sectional view taken along section 9—9 of FIG. 7.
Figure 10:
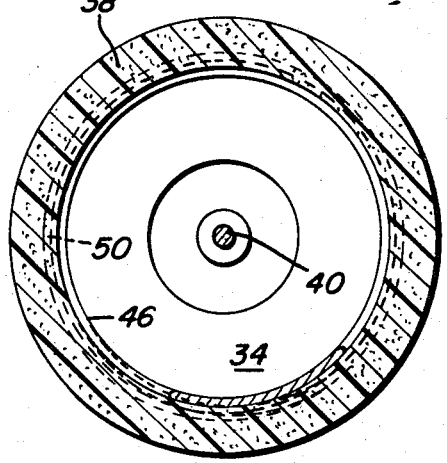
FIG. 10 is a sectional view taken along section 10—10 of FIG. 9.

Referring to FIGS. 7–10, a second form of the air filter construction of the present invention is generally indicated by the numeral 30 and is illustrated in FIG. 7 as being mounted to a typical carburetor 32 having a pair of oppositely disposed mounting flanges 34 and 36. A filter element 38 is provided which is similar to that of the first form but is open at both ends in order to accommodate the passage of a mounting shaft 40 interconnecting the carburetor fitting at 42 with mounting flange 36 by way of wing and lock nuts indicated at 44. A coil compression spring 46 engages the interior surfaces of filter element 38 along substantially the entire length of the filter element with the convolutions being substantially spaced apart to permit easy passage of the air through the filter element into the carburetor intake opening. It will be appreciated that the end convolutions 48, 50 of the compression spring 46 are of slightly greater diametric spacing than the remainder of the convolutions such that they are retentatively disposed in internal circumferential grooves 52 and 54 adjacent the open ends of the filter element. As such, the end convolutions impart longitudinal compression forces to the ends of the filter element thereby assuring a proper seal with the associated mounting flanges which is effective to prevent the passage of contaminated air directly into the carburetor intake opening.

It will be appreciated that while the second form of the air filter construction of the present invention is more restrained at its outer end against flexing, a majority of convolutions are free to vibrate and flex somewhat radially and laterally of the mounting shaft to provide a self-cleaning action due to motor and road vibrations. Furthermore, the second form of the filter construction may be cleaned and lubricated in a manner similar to that described above.

From the foregoing descriptions, it is apparent that the air filter constructions of the present invention are rugged, durable, long-lasting, and relatively inexpensive to manufacture and maintain. Furthermore, the form illustrated in FIGS. 1–6 is readily adaptable to carburetor installations entailing carburetor intake fittings of different size and relatively small mounting spaces which are often encountered with motorcycle carburetor positioning.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an engine-mounted carburetor having an air intake with a generally cylindrical exterior mounting, a filter construction comprising a flexible filter element of compressible foam material adapted to permit the passage of air therethrough to remove contaminants from the air before entering the carburetor, said filter element normally being of generally cylindrical configuration opened at one axial end thereof and closed at the opposite axial end thereof, flexible coil means positioned in the interior of said filter element for supporting said filter element and for permitting changing of the configuration of the filter construction, said coil means including a plurality of spaced convolutions supporting said filter element and allowing unrestricted passage of air therethrough and a plurality of mounting convolutions in surrounding retentative engagement with the exterior of said cylindrical mounting, said filter element adjacent its opened end surrounding said mounting convolutions, said flexible filter element and said coil means being free to flex together about said air intake mounting to assume selected configuration for close-quarters mounting with the engine, and clamping means extending around said filter element and said mounting convolutions to compress and deform a portion of said flexible filter element adjacent its open end against said mounting convolutions, whereby said mounting convolutions are retentively pressed against the exterior of said cylindrical air intake mounting and a seal is formed around said air intake mounting to prevent the passage of contaminates directly into the air intake.

2. The combination set forth in claim 1, wherein said coil means includes a coil member normally of generally helical configuration along a substantial portion of its length.

3. The combination set forth in claim 2, wherein said coil spring is resilient in nature.

4. The combination set forth in claim 1, wherein said coil means includes a coil spring which is resilient in nature.

* * * * *